United States Patent [19]

Cella et al.

[11] Patent Number: 4,833,190

[45] Date of Patent: May 23, 1989

[54] ZINC BORATE AS A SMOKE SUPPRESSANT

[75] Inventors: James A. Cella, Clifton-Park; Elbridge A. O'Neil, Jr., Port Henry; David A. Williams, Scotia, all of N.Y.

[73] Assignee: General Electric Company, Waterford, N.Y.

[21] Appl. No.: 127,617

[22] Filed: Nov. 27, 1987

[51] Int. Cl.$^4$ .............................................. C08K 3/38
[52] U.S. Cl. ................................................... 524/405
[58] Field of Search ........................................ 524/405

[56] References Cited

U.S. PATENT DOCUMENTS

| | | | |
|---|---|---|---|
| 3,317,455 | 5/1967 | Blome et al. | 521/154 |
| 3,524,761 | 8/1970 | Humphrey | 524/405 |
| 3,912,650 | 10/1975 | Khalid et al. | 524/405 |
| 3,929,660 | 12/1975 | Khalid | 524/405 |

Primary Examiner—Veronica P. Hoke
Attorney, Agent, or Firm—John W. Harbour

[57] ABSTRACT

Zinc borate is added to high hydrocarbon content silicone containing compositions to reduce smoke emission.

19 Claims, No Drawings

ZINC BORATE AS A SMOKE SUPPRESSANT

This application is a continuation of application Ser. No. 891,459 filed July 28, 1986, now abandoned.

BACKGROUND OF THE INVENTION

This invention relates to zinc borate as a smoke suppressant. More particularly, this invention relates to zinc borate as a smoke suppressant in high hydrocarbon content combustible silicone containing compositions.

The use of metal borates including zinc borate as smoke suppressants for PVC and other polyolefin materials has been reported in a number of publications and patents. Zinc borate is known to work well as a smoke suppressant when used either alone or in combination with antimony oxide for polymer compositions containing halogen, but is generally ineffective for non-halogen containing materials.

U.S. Pat. No. 4,182,799 discloses flame retardant additives for polystyrene foam. These additives comprise 40–56% by weight halogentated hydrocarbon, 14–22% by weight zinc borate, and 16–23% by weight Al(OH)$_3$.

Cowan, J.; Manley, T. R.; Br. Polym. J. 1976, 8(2), 44-7 disclose flame retardants and smoke suppressants for flexible PVC film. Ba and Ca borates with or without Sb$_2$O$_3$ had little or no flame retardency, but Zn borate had a synergistic effect with Sb$_2$O$_3$. Zn borate and Sb$_2$O$_3$ were also found to be the most effective smoke suppressants.

Shen, Kelvin K., Sprague, Robert W.; J. Vinyl Technology 1982, 4(3), 120-3 disclose flame retardants and smoke suppressants for PVC. Zinc borate alone was found to be an effective flame retardant. Zinc borate in synergism with Al(OH)$_3$ was found to be an effective smoke suppressant.

Shen, Kelvin K.; Sprague, Robert W.; J. Fire Retardant Chemistry 1982, 9(3), 161-71 discloses flame retardants for epoxy resins. Zinc borate alone was found to be an ineffective flame retardant or smoke suppressant for epoxy resins in the absence of a halogen source.

It is the object of the present invention to utilize zinc borate as a flame retardant and smoke suppressant for certain silane containing compositions.

It is another object of the present invention to utilize zinc borate as a flame retardant and smoke suppressant for silicone containing compositions having high hydrocarbon content, particularly where the hydrocarbon content is in the form of aromatic rings.

DETAILED DESCRIPTION OF THE INVENTION

Briefly, according to the present invention, there are provided high hydrocarbon content combustible silicone containing compositions exhibiting reduced smoke generation which comprise:

(a) sufficient hydrocarbon content that elemental carbon constitutes at least about 40% by weight the total composition;

(b) sufficient silicone polymer or copolymer that elemental silicon constitutes at least about ½% by weight the total composition; and (c) sufficient zinc borate to reduce smoke generation.

Combustible silicone containing compositions, which are the subject of the present invention, have relatively high hydrocarbon contents such that these silicone containing compositions will in the absence of flame retardants either freely support combustion or will flame under applied heat. The hydrocarbon content of these silicone containing compositions may exist in various forms. It may be an alkylene group, alkyl group, aryl group, etc., on a silicone polymer or copolymer. It may be a carbonate moiety, imide moiety, urethane moiety, etc., in a silicone copolymer or block copolymer. It may be a polyolefin, polycarbonate, polyester, poly(phenylene-ether), etc., which has been blended with a silicone polymer or copolymer. Regardless of how the hydrocarbon is contained within the silicone containing composition, it should be considered as such and as contributing to combustibility. Generally, for a silicone containing composition to have a relatively high hydrocarbon content as mentioned above, it must contain, on an elemental level, at least about 40% by weight carbon, and more preferably at least about 50% by weight carbon. Silicone containing compositions having 60% carbon by weight will particularly benefit from the present invention.

Applicants believe the present invention to be most beneficial in the instance where the hydrocarbon content is substantially in the form of aromatic rings. Thus, at least 40% and preferably 50% by weight of the elemental carbon is contained in aromatic rings, it is believed that maximum benefit can be derived herefrom.

The hydrocarbon content of these silicone containing compositions may or may not have present therein organic halogens. Organic halogens are commonly used as flame retardants and inclue decabromodiphenyl ether, tribromopolystyrene and the like.

In order for the composition to be considered silicone containing, it must contain sufficient silicone resin that the relatively low level of hydrocarbon smoke generation is significantly increased. Such increase should not require the presence of very large amounts of silicone. It is considered herein that silicone polymer or copolymer in sufficient amounts that silicon constitutes greater than about ½% by weight of the total composition will significantly increase smoke generation. Silicon present at greater than 2% by weight should increase smoke generation and silicon present at greater than 10% by weight is known to produce about an 8 fold increase in smoke generation by some standards.

Silicone polymer or copolymer contain recurring units of the formula $$R_a SiO_{(4-a)/2}$$

wherein a can vary from greater than zero to less than three, and R can be alkyl, aryl, alkenyl, halogenated alkyl, halogenated aryl, and the like. Preferably, a is 2 and R is methyl, phenyl, or vinyl. Of course, the silicone polymer or copolymer may be substituted with hydride, hydroxy, alkoxy, etc.

Silicone containing compositions which are the subject of the present invention include specifically (1) high hydrocarbon content silicone polymers and copolymers; (2) blends of silicone polymers; (3) cocondensates of silicone polymers and copolymers with organic polymer; and (4) blends of the above. Of course, other silicone containing compositions may be imagined including silicone plasticizers used in organic plastics, etc.

High hydrocarbon content silicone polymers and copolymers as mentioned above generally have substituted or unsubstituted higher aliphatic or aromatic organic groups on the silicone polymer. These groups may be alkoxy groups, vinyl groups, epoxy groups, acrylic groups, allyl groups, phenyl groups, etc. The silicone polymer itself may be linear, branched, or cross-linked. Generally, these polymers and copolymers have not been technically important due to poor heat stability. However, such polymers and copolymers which contain a relatively high number of phenyl groups are known and utilized. As to these specific polymers, reference is made to U.S. Pat. Nos. 3,328,346; 2,868,766; and 2,611,774 hereby incorporated by reference. Also, there are silicone copolymers in which an arylene group is contained in the polymer chain. As to these silarylene siloxane copolymers, reference is made to U.S. Pat. No. 4,340,711, hereby incorporated by reference.

Blends of silicone polymers and copolymers with organic polymers include both blends where the silicone polymer or copolymer forms the major constituent and blends where the organic polymer forms the major constitutent. It is not possible to make any general statements about the organic polymers that are at least to some extent compatible with silicone polymers and copolymers. Polymers most likely to be compatible are polymethacrylates, urea-formaldehyde resins, melamine-formaldehyde resins, chlorinated di- and terphenyls, polyesters, and alkyd resins. However, the compatibility of these organic polymers with silicone polymers cannot always be determined beforehand. Silicone polymers which have been modified with organic constituents often make compatibility more certain.

Co-condensates or silicone polymers and copolymers with organic polymers are generally intended to combine the good properties of the polysiloxanes with those of the organic polymers. The cocondensates may be silicone polymers having structural carbon units in the backbone, such as polyalkyleneoxysiloxanes; block copolymers having blocks of siloxane and organic polymers; or grafted or crosslinked networks of silicone polymers and organic polymers. Copolymers of silicones and aldehydes may be made by the reaction of formaldehyde hydrate with dimethyldichlorosilane. Copolymers of silicone and polyalcohols or polyphenols may be made by reacting, for example, a halide, hydride, or alkoxy substituted silicone or silane with, for example, a glycerol, 4,4'-dihydroxybenzophenone, 4,4'-dihydroxydiphenylpropane, or 4,4'-dihydroxydiphenyl methane. Copolymers of silicone with polyether can be produced having Si—O—C bridges where hydroxyl containing polyether is caused to react with silanes and siloxanes containing Si—O—$C_2H_5$, Si—H, or Si—N groupings. Analogous copolymers of silicone with polyether can be produced having Si—C bridges where polyethers containing alkenyl groups are addition reacted with silanes or siloxanes containing Si—H groups. Copolymers of silicone with polyester can be produced where the linkage is through an Si—O—C bridge by reacting hydroxyl containing polyesters with halide, hydride, hydroxy or alkoxy substituted silicone or silane. Copolymers of silicone with polyester can be produced where the linkage is through an Si—C bridge by reacting a carboxy organosilane or carboxyorganosiloxane with hydroxyl containing polyester. Copolymers of silicone with polyolefin may be produced by polymerizing, for example, ethylene or propylene in the presence of a vinyl or allyl containing siloxane or silane. Siloxane-carbonate copolymers are described in U.S. Pat. No. 3,189,662 and 3,821,325, hereby incorporated by reference. Other silicone containing polymers include siloxane-urethane copolymers, siloxane-epoxyhydroxy copolymers, siloxane-phenol-formaldehyde, etc.

Of particular interest herein are copolymers of siloxane with polyimide or polyetherimide. These polymers have siloxane-imide blocks having units of the formula:

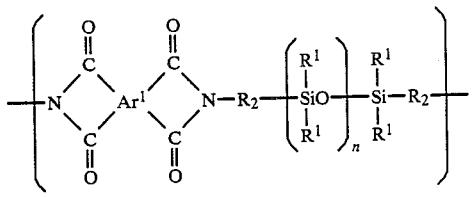

where $Ar^1$ can be a tetravalent benzene or naphthalene nucleus or a tetravalent group of the formula

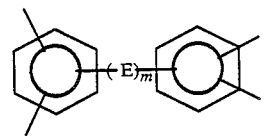

where m is 0 or 1 or E is

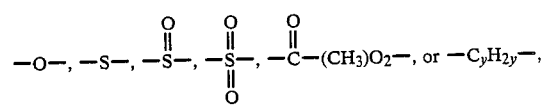                I.

where y is an integer from 1 to 8.

In a more preferred embodiment $Ar^1$ of formula I includes diether linkages so as to increase the solubility of the final product in diglyme. Thus, in the more preferred embodiment, $Ar^1$ formula I is a tetravalent residue of the formula

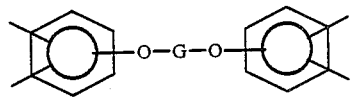

where G is phenylene or a group of the formula

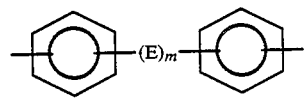

where E and m are as previously defined.

Especially preferred is an $Ar^1$ group in formula I having the formula

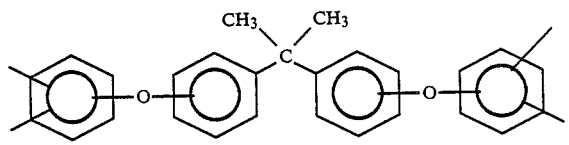

A more complete listing of suitable $Ar^1$ radicals can be found in U.S. Pat. No. 4,395,527.

R in formula I can be any substituted or unsubstituted hydrocarbylene radical, for example, a linear or branched alkylene radical having up to about 20 carbon atoms such as methylene, ethylene, propylene, isopropylene, isobutylene; an alkylene radical having up to about 20 carbon atoms which is interrupted in the chain by one or more phenylene radicals; or a radical of the formula —Q—Z—$R^3$—, where Q is any substituted or unsubstituted aromatic hydrocarbylene radical such as phenylene or naphthalene, or a heterocyclic aromatic radical where the hereto atom is selected from N, O and S; Z is —O—, —S—,

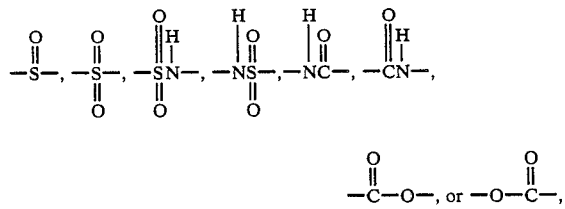

and $R^3$ is a hydrocarbylene radical within the scope of R. Preferably R is a lower alkylene radical and most preferably is propylene. These and other suitable R groups are known in the art and are described more fully in U.S. Pat. Nos. 3,325,450 and 4,395,527.

$R^1$ radicals in formula I can be any independently selected monovalent substituted or unsubstituted radicals typically bonded to silicon atoms of a polysiloxane. Among the more preferred $R^1$ radicals are lower alkyl radicals such as methyl, ethyl, propyl or butyl radicals, phenyl radicals, vinyl radicals, 3,3,3-trifluoropropyl radicals and the like. Depending upon the desired properties of the final product, the artisan can select suitable $R^1$ radicals, as well as all the other radicals, in proper ratios without undue experimentation.

In addition to blocks of formula 1 above, there may also be present blocks having the formula

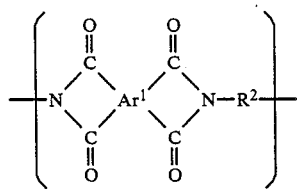

II.

where $Ar^1$ is as defined in formula I and $R^2$ is a divalent organic radical. Preferred $R^2$ include ethylene, trimethylene, isopropylidene, [-(CH$_3$)C(CH$_3$)—], isobutylene, tetramethylene, pentamethylene, phenylene, substituted phenylene, toluene, xylene, biphenylene

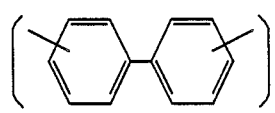

diphenylene methane (—$C_6H_4$—$CH_2$—$C_6H_4$—), diphenylene oxide

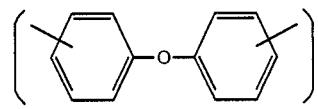

diphenylene sulfone, etc., with valences of the arylene radicals being ortho, meta, or para to each other or to connecting bonds between adjacent arylene radicals.

The preparation of polyimides and, more particularly, silicone-imide copolymers, is well known in the art, for example, as taught in U.S. Pat. Nos. 3,325,450 and 4,395,527, both of which are hereby incorporated by reference. Generally polyimides are prepared by reacting a dianhydride with a diamine, the diamine in this case being an organic diamine and a siloxane diamine. Relative reactivities of the monomers must be considered in a reaction scheme to obtain a truly random block where such is desired.

Zinc borate suitable for use herein has a typical formulation ZnO 45%, $B_2O_3$ 34%, and may have 20% water of hydration. It is produced by the interaction of oxides at 500°–1000° C. or by the interaction of zinc oxide slurries with solutions of boric acid or borax. The particular zinc borate used herein has the formula 2 ZnO 3$B_2O_3$ 3.5$H_2O$, a refractive index of 1.58 and a mean particle size in the range of 2–10 microns. This zinc borate is sold under the registered trademark FIREBRAKE ZB and is manufactured in accordance with the teachings of U.S. Pat. No. 3,549,316, hereby incorporated by reference.

Persons skilled in the art can easily determine what amount of zinc borate is necessary to reduce smoke generation. It has been found herein that where 5% by weight of the silicone containing composition is zinc borate, smoke generation is greatly reduced. Where the composition is 10% by weight, smoke generation is likewise reduced but without a great reduction over the 5% by weight level. Thus, it is recommended herein that the zinc borate should be added to the silicone containing composition in amounts ranging from about 1% to about 15% by weight and most advantageously in amounts ranging from about 2% to about 10% by weight.

The zinc borate is dispersed in the silicone containing composition as appropriate. For thermoplastic materials, the zinc borate is added in a melt blending process. For a thermoset, zinc borate must be added prior to crosslinking.

In order to better enable the artisan to practice the present invention, the following examples are provided by way of illustration and not by way of limitation. All parts are by weight unless otherwise noted.

EXAMPLES

Example 1

Bis (gamma-aminopropyl) tetramethyldisiloxane was produced according to U.S. Pat. No. 4,584,393 and equilibrated for varying times with octamethylcyclotetrasiloxane to produce bis (gamma-aminopropyl) polydimethylsiloxane (GAPD) having varying siloxane chain lengths. Equilibration was carried out at about 150° C. in the presence of KOH.

Examples 2-12

GAPD of Example 1 having a silicone chain length as shown in Table 1, was reacted with bisphenol-A-dianhydride (BPADA) and metaphenylenediamine (MPD) to produce a poly (siloxane-ether-imide). The amount of GAPD present in the copolymer varied as shown in Table 1, i.e. the GAPD constituted varying amounts on a mole basis of the total diamine content of the copolymer. The copolymer was molded into 3"×3"×⅛" test plaques for the NBS Smoke Test and into 5"×½"×⅛" test bars for the UL-94 flame test.

TABLE 1

| Example | Poly (silicone-ether-imide) | Calcium Carbonate Wt % | Zinc Borate Wt % | GAPD Silicone Chain Length | GAPD Silicone Mol % Diamine | Wt % Silicone | Wt % Silicon | Wt % Carbon | D max 2,3 Smold'g | D max 2,4 Flam'g | UL-94[5] |
|---|---|---|---|---|---|---|---|---|---|---|---|
| Control | 100[1] | — | — | — | 0 | 0 | 0 | — | 1.6 | 58 | V-0 |
| 2 | 100 | — | — | 15.7 | 20 | 33.0 | 11.2 | 62.5 | 30.3 | 236 | V-0 |
| 3 | 100 | — | — | 15.7 | 25 | 38.3 | 13.1 | 60.4 | 27.2 | 373 | V-0 |
| 4 | 100 | — | — | 15.7 | 30 | 42.9 | 14.7 | 58.6 | 26.3 | 436 | V-0 |
| 5 | 100 | — | — | 9 | 40 | 37.0 | 12.8 | 60.8 | 35.6 | 425 | V-0 |
| 6 | 95 | — | 5 | 9 | 40 | 37.0 | 12.8 | 60.8 | 38.1 | 214 | V-0 |
| 7 | 95 | 5 | — | 9 | 40 | 37.0 | 12.8 | 60.8 | 30.6 | 287 | V-0 |
| 8 | 100 | — | — | 15 | 20 | 33.0 | 10.9 | 62.8 | 37.1 | 390 | V-0 |
| 9 | 95 | — | 5 | 15 | 20 | 33.0 | 10.9 | 62.8 | 22.1 | 96 | V-0 |
| 10 | 95 | 5 | — | 15 | 20 | 33.0 | 10.9 | 62.8 | 37.0 | 259 | V-0 |
| 11 | 100 | — | — | 21.5 | 20 | 39.6 | 13.7 | 59.6 | 39.7 | 260 | V-0 |
| 12 | 100 | — | — | 9 | 37.5 | 37 | 12.3 | 61.4 | 39.0 | 413 | V-0 |

[1] ULTEM 1000 resin, poly(bisphenol-A-dianhydride-meta phenylene diamine) manufactured by General Electric Company
[2] NBS Smoke Density Test, ASTM E662
[3] One sample
[4] 3 sample average
[5] At least five sample average

What is claimed is:

1. A composition of matter exhibiting reduced smoke generation comprising cocondensates of silicone homopolymers and-copolymers with organic polymers and characterized by:

2. The composition of claim 1 wherein said elemental carbon constitutes at least about 50% by weight of the total composition.

3. The composition of claim 1 wherein said elemental carbon constitutes at least about 60% by weight of the total composition.

4. The composition of claim 1 wherein said elemental silicon constitutes at least about 2% by weight of the total composition.

5. The composition of claim 1 wherein said elemental silicon constitutes at least about 10% by weight of the total composition.

6. The composition of claim 1 wherein at least about 40% by weight of the elemental carbon is contained in aromatic rings.

7. The composition of claim 1 wherein at least about 50% by weight of the elemental carbon is contained in aromatic rings.

8. The composition of claim 1 which contains no organic halogen.

9. The composition of claim 1 wherein the silicone polymer comprises recurring units of the formula $RaSiO_{(4-a)/z}$ wherein a can vary from greater than 0 to less than 3, and R is selected from the group consisting of alkyl, aryl, alkenyl, halogenated alkyl, and halogenated aryl.

10. The composition of claim 9 wherein a is 2 and R is selected from the group consisting of methyl, phenyl, and vinyl.

11. The composition of claim 1 in which the high hydrocarbon content silicone polymer is selected from the group consisting of high phenyl content silicone homopolymers or copolymers and silarylene siloxane copolymers.

12. The composition of claim 1 which consists essentially of cocondensates of silicone homopolymers and copolymers with organic polymers and sufficient zinc borate to reduce smoke generation.

13. The composition of claim 12, wherein said cocondensates are selected from the group consisting of copolymers of polysiloxane and aldehydes, copolymers of polysiloxane and polyalcohols or polyphenols, copolymers of polysiloxane and polyether, copolymers of polysiloxane and polyester, copolymers of polysiloxane and polyolefin and polysiloxane carbonate copolymers.

14. The composition of claim 12 wherein said cocondensate is a copolymer of polysiloxane with polyimide or polyetherimide.

15. The composition of claim 14 wherein said copolymer of polysiloxane with polyimide or polyetherimide comprises siloxane-imide blocks of the formula:

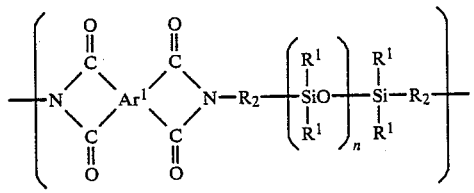

where R is a hydrocarbylene radical, $R^1$ is a substituted or unsubstituted monovalent hydrocarbon radical, $Ar^1$ can be a tetravalent benzene or naphthalene nucleus or a tetravalent group of the formula

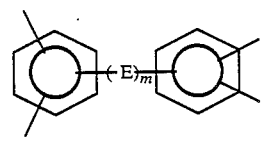

where M is 0 or 1, n is at least 1 and E is

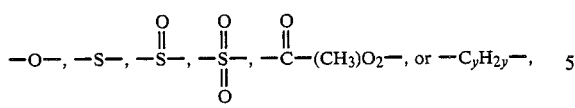

where y is an integer from 1 to 8.

16. The composition of claim 15 wherein said Ar¹ is a tetravalent residue of the formula

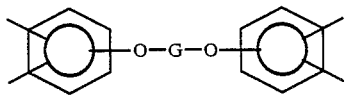

where G is phenylene or a group of the formula

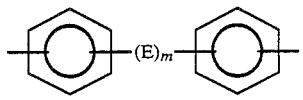

where E and m are previously defined.

17. The composition of claim 5 wherein said Ar¹ is

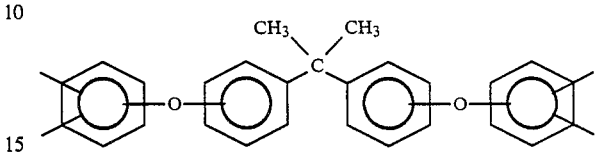

18. The composition of claim 15 wherein n varies on average from about 1 to about 1 to about 50.

19. The composition of claim 15 wherein R is methylene, ethylene, or propylene.

* * * * *

UNITED STATES PATENT AND TRADEMARK OFFICE
CERTIFICATE OF CORRECTION

PATENT NO. : 4,833,190

DATED : May 23, 1989

INVENTOR(S) : James A. Cella et al

It is certified that error appears in the above-identified patent and that said Letters Patent is hereby corrected as shown below:

On the title page Insert

Related U.S. Application Data

--(62) Continuation of application Serial No. 891,459, filed July 28, 1986, now abandoned --.

Signed and Sealed this

Twenty-first Day of November, 1989

Attest:

JEFFREY M. SAMUELS

Attesting Officer    Acting Commissioner of Patents and Trademarks

UNITED STATES PATENT OFFICE
CERTIFICATE OF CORRECTION

PATENT NO. : 4,833,190

DATED : May 23, 1989

INVENTOR(S) : James A. Cella, Elbridge A. O'Neil, Jr., David A. Williams

It is certified that error appears in the above-identified patent and that said Letters Patent is hereby corrected as shown below:

Claim 1 should read as follows:

1. A composition of matter exhibiting reduced smoke generation comprising cocondensates of silicone homopolymers and copolymers with organic polymers and characterized by:

(a) sufficient hydrocarbon content that elemental carbon constitutes at least about 40% by weight the total composition;

(b) sufficient silicone polymer that elemental silicon constitutes at least about ½% by weight the total composition; and (c) sufficient zinc borate to reduce smoke generation.

In Claim 17, the expression "claim 5" should read as -- claim 15 --.

UNITED STATES PATENT OFFICE
CERTIFICATE OF CORRECTION

PATENT NO.  : 4,833,190
DATED       : May 23, 1989
INVENTOR(S) : James A. Cella, Elbridge A. O'Neil, Jr., David A. Williams It is certified that error appears in the above-identified patent and that said Letters Patent is hereby corrected as shown below:

In Claim 18, line 2, after the number "1", delete the phrase "to about 1".

Signed and Sealed this

Fourteenth Day of May, 1991

Attest:

HARRY F. MANBECK, JR.

Attesting Officer

Commissioner of Patents and Trademarks